(12) United States Patent
Fukushima et al.

(10) Patent No.: US 7,865,288 B2
(45) Date of Patent: Jan. 4, 2011

(54) ENGINE CONTROL DEVICE FOR WORKING VEHICLE

(75) Inventors: Akira Fukushima, Mooka (JP); Nobuo Matsuyama, Komatsu (JP)

(73) Assignee: Komatsu Ltd., Tokyo (JP)

( * ) Notice: Subject to any disclaimer, the term of this patent is extended or adjusted under 35 U.S.C. 154(b) by 439 days.

(21) Appl. No.: 12/093,732

(22) PCT Filed: Dec. 1, 2006

(86) PCT No.: PCT/JP2006/324087

§ 371 (c)(1),
(2), (4) Date: May 15, 2008

(87) PCT Pub. No.: WO2007/072672

PCT Pub. Date: Jun. 28, 2007

(65) Prior Publication Data

US 2009/0240406 A1 Sep. 24, 2009

(30) Foreign Application Priority Data

Dec. 22, 2005 (JP) .............................. 2005-369216

(51) Int. Cl.
*G06F 19/00* (2006.01)
(52) U.S. Cl. .............................. 701/54; 701/53; 180/69; 180/307; 477/107; 477/111
(58) Field of Classification Search ............. 701/53–54; 180/69, 307; 475/75; 477/107, 111; 37/382
See application file for complete search history.

(56) References Cited

U.S. PATENT DOCUMENTS 4,606,313 A * 8/1986 Izumi et al. ................. 123/386

(Continued)

FOREIGN PATENT DOCUMENTS

JP 06-35872 B2 5/1994

(Continued)

OTHER PUBLICATIONS

Simulation of Gear-shift Algorithm for Automatic Transmission Based on MATLAB; Lu Xi et al.; Software Engineering, 2009. WCSE '09. WRI World Congress on; vol. 2; Digital Object Identifier: 10.1109/WCSE.2009.198; Publication Year: 2009 , pp. 476-480.*

(Continued)

*Primary Examiner*—Cuong H Nguyen
(74) *Attorney, Agent, or Firm*—Global IP Counselors

(57) ABSTRACT

An engine control device is adapted to a working vehicle that is capable of switching between a power mode and an economy mode, and capable of forcibly downshifting through gears of a transmission so as to shift down to a lower speed side. The engine control device includes an engine mode determining section configured to determine whether the engine mode is in the power mode or the economy mode, a gear detection section configured to detect current gear of a plurality of gears, a kick-down detection section configured to detect a kick-down instruction, and a control section configured to switch the engine into the power mode when the kick-down instruction is detected while the engine mode is in the economy mode and the gears are in the lowest gear.

5 Claims, 7 Drawing Sheets

| GEARCHANGE LEVER | A/M | OPERATION | | |
|---|---|---|---|---|
| | | NORMAL GEAR CHANGING | KICKDOWN SWITCH ON | |
| | | | GEAR CHANGE | E → P |
| 3, 4 | AUTOMATIC TRANSMISSION | AUTOMATIC TRANSMISSION IN SECOND, THIRD, AND FOURTH | SHIFT ONE GEAR DOWN OR GO INTO FIRST | IN EFFECT |
| 2 | | FIXED IN SECOND | 2 → 1 | IN EFFECT |
| 1 | | FIXED IN FIRST | STAY IN FIRST | NOT IN EFFECT |
| 1, 3, 4 | MANUAL TRANSMISSION | FIXED IN FIRST, THIRD, FOURTH | STAY IN FIRST, THIRD, FOURTH | NOT IN EFFECT |
| 2 | | FIXED IN SECOND | 2 → 1 | IN EFFECT |

U.S. PATENT DOCUMENTS

| | | | | |
|---|---|---|---|---|
| 4,699,021 | A | * | 10/1987 | Waddington ................... 477/1 |
| 4,881,428 | A | * | 11/1989 | Ishikawa et al. ............ 477/110 |
| 4,953,427 | A | * | 9/1990 | Ushiro ........................ 477/68 |
| 5,109,730 | A | * | 5/1992 | Zahn et al. .................. 477/121 |
| 5,406,483 | A | * | 4/1995 | Kallis et al. ................... 701/53 |
| 5,493,938 | A | * | 2/1996 | Park .......................... 74/733.1 |
| 5,679,092 | A | * | 10/1997 | Otsubo et al. ................. 477/97 |
| 6,044,318 | A | * | 3/2000 | Bourdon et al. ............... 701/65 |
| 6,582,340 | B1 | * | 6/2003 | Arie et al. ..................... 477/97 |
| 6,889,132 | B2 | * | 5/2005 | Bidner et al. ................. 701/89 |
| 7,022,044 | B2 | * | 4/2006 | Legner et al. ................. 477/68 |

FOREIGN PATENT DOCUMENTS

| | | | | |
|---|---|---|---|---|
| JP | 06-35872 | B2 | * | 5/1994 |
| JP | 10-121522 | A | * | 5/1998 |
| JP | 10-121522 | A | | 5/1998 |
| JP | 2004-076649 | A | * | 3/2004 |
| JP | 2004-76649 | A | | 3/2004 |
| JP | 2004-150305 | A | | 5/2004 |
| JP | 2004-150305 | A | * | 5/2004 |
| JP | 2004-324511 | A | | 11/2004 |
| JP | 2004-324511 | A | * | 11/2004 |
| WO | WO-97/27388 | A1 | | 7/1997 |

OTHER PUBLICATIONS

Neuro fuzzy transmission control for automobile with variable loads; Hayashi, K.; Shimizu, Y.; Dote, Y.; Takayama, A.; Hirako, A.; Control Systems Technology, IEEE Transactions on; vol. 3 , Issue: 1; Digital Object Identifier: 10.1109/87.370709 Publication Year: 1995 , pp. 49-53.*

Development of Hybrid Powertrain Controller for a PSHEV ; Zhou Lei et al ; Vehicular Electronics and Safety, 2006. ICVES 2006. IEEE International Conference on; Digital Object Identifier: 10.1109/ICVES.2006.371587; Publication Year: 2006 , pp. 222-227.*

Application of Time-Optimal Strategy and Fuzzy Logic to the Engine Speed Control during the Gear-Shifting Process of AMT Xiaofeng Yin et al.; Fuzzy Systems and Knowledge Discovery, 2007. FSKD 2007. Fourth International Conference on vol. 4; Digital Object Identifier: 10.1109/FSKD.2007.184; Publication Year: 2007 , p. 46.*

Study of Shifting without Driving Force Interrupt for Double Electric Motor HEV; Wang Jiaxue et al.; Energy and Environment Technology, 2009. ICEET '09. International Conference on; vol. 1; Digital Object Identifier: 10.1109/ICEET.2009.86 Publication Year: 2009 , pp. 333-336.*

Power delivery co-ordination to meet driver's demand in a mild hybrid vehicle with automated manual transmission; Fayazi, S.A.; et al..; Industrial Electronics, 2008. IECON 2008. 34th Annual Conference of IEEE; Digital Object Identifier: 10.1109/IECON.2008.4757974; Publication Year: 2008 , pp. 327-332.*

Dual-Mode Power-Split Transmission for Hybrid Electric Vehicles; Mashadi, B. et al.; Vehicular Technology, IEEE Transactions on; vol. 59 , Issue: 7; Digital Object Identifier: 10.1109/TVT.2010.2049870; Publication Year: 2010 , pp. 3223-3232.*

Adaptive Fuzzy Shift Strategy in Automatic Transmission of Construction Vehicles; Weibo Yu et al.; Mechatronics and Automation, Proceedings of the 2006 IEEE International Conference on; Digital Object Identifier: 10.1109/ICMA.2006.257825 Publication Year: 2006 , pp. 1357-1361.*

An optimal control-based algorithm for Hybrid Electric Vehicle using preview route information; Ngo, Dac Viet; Hofman, Theo; Steinbuch, Maarten; Serrarens, Alex F. A.; American Control Conference (ACC), 2010; Publication Year: 2010 , pp. 5818-5823.*

* cited by examiner

Fig. 7

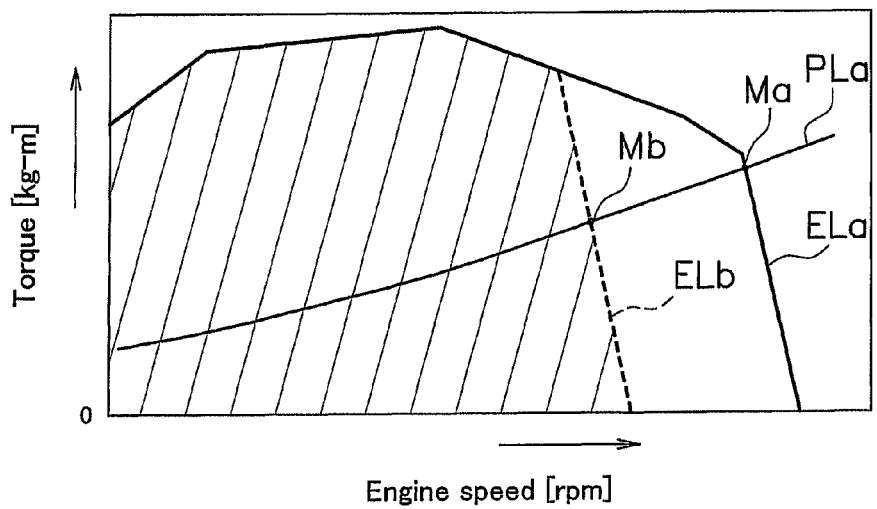

Fig. 8

| GEARCHANGE LEVER | A/M | OPERATION | | |
|---|---|---|---|---|
| | | NORMAL GEAR CHANGING | KICKDOWN SWITCH ON | |
| | | | GEAR CHANGE | E → P |
| 3, 4 | AUTOMATIC TRANSMISSION | AUTOMATIC TRANSMISSION IN SECOND, THIRD, AND FOURTH | SHIFT ONE GEAR DOWN OR GO INTO FIRST | IN EFFECT |
| 2 | | FIXED IN SECOND | 2 → 1 | IN EFFECT |
| 1 | | FIXED IN FIRST | STAY IN FIRST | NOT IN EFFECT |
| 1, 3, 4 | MANUAL TRANSMISSION | FIXED IN FIRST, THIRD, FOURTH | STAY IN FIRST, THIRD, FOURTH | NOT IN EFFECT |
| 2 | | FIXED IN SECOND | 2 → 1 | IN EFFECT |

ENGINE CONTROL DEVICE FOR WORKING VEHICLE

CROSS-REFERENCE TO RELATED APPLICATIONS

This U.S. National stage application claims priority under 35 U.S.C. §119(a) to Japanese Patent Application No. 2005-369216, filed in Japan on Dec. 22, 2005. The entire disclosure of Japanese Patent Application No. 2005-369216 is hereby incorporated herein by reference.

TECHNICAL FIELD

The present invention relates to an engine control device for a working vehicle, and particularly relates to an engine control device for a working vehicle capable of switching the engine mode between a power mode and an economy mode, and capable of forcibly kicking down through gears of a transmission to a low speed side.

BACKGROUND ART

With working vehicles such as wheel loaders, it is possible for an operator to perform operations to select a power mode giving priority to work performance and an economy mode giving priority to energy consumption (for example, Japanese Patent Application Laid-open No. Hei. 6-35872). It is also possible to match engine output torque and hydraulic pump absorption torque with the engine speed and output torque in comparatively high speed regions when the power mode is selected by this kind of working vehicle. Further, when the economy mode is selected, it is also possible to set an engine output torque characteristic low compared to the case of the power mode, and adjust the amount of oil emitted by the hydraulic oil pump for a working equipment hydraulic pump so as to change pump absorption torque characteristics. In the case of economy mode, the engine output torque and absorption torque of the hydraulic pump are matched in a region where speed and output torque of the engine are comparatively low compared to the case of the power mode. Further, in the economy mode, it is also possible to match the output torque of the engine and the absorption torque of the hydraulic pump at a matching point where a fuel consumption rate is lower than for matching in the power mode. It is therefore possible to use the engine in a region where fuel efficiency is good and it is possible to improve fuel consumption.

A working vehicle is typically provided with a kick-down switch for shifting down gears (for example, Japanese Patent Publication Laid-Open No. Hei. 10-121522). This kick-down switch is located on, for example, an upper surface of a grip of an operation lever of the working equipment. During manual transmission control, it is possible to shift down to a lower gear one gear at a time (shift down) each time the kick-down switch is pressed. During automatic transmission control, it is possible to forcibly shift down the gears to the lowest gear by pressing the kick-down switch when the vehicle is traveling at low velocity.

SUMMARY OF THE INVENTION

Working vehicles capable of switching between the power mode and the economy mode typically select the power mode to perform work when the working load is substantial. Work such as excavating earth can therefore be carried out in an effective manner. On the other hand, the economy mode is selected when working loads are light or when traveling, and it is therefore possible to reduce fuel consumption.

There are therefore cases where there can temporarily be no engine output when the economy mode is selected. With vehicles of the related art, in such cases, it is possible to switch from the economy mode to the power mode using a mode switching switch.

However, mode switching switches are normally provided at a panel arranged to the right side of the operator. The operator therefore has to take their hand away from the operation lever of the working equipment in order to operate the mode switching switch. Work is therefore disrupted and work efficiency deteriorates.

It is therefore an object of the present invention to enable increases in the output of the engine smoothly without impairing the ability to work when working in the economy mode.

An engine control device for a working vehicle of a first aspect of the invention is an engine control device for a working vehicle, capable of switching between engine modes of a power mode where an engine operates at high-horsepower giving priority to work performance and an economy mode where an engine operates at low-horsepower giving priority to low fuel consumption, and capable of forcibly downshifting through gears of a transmission so as to shift down to a lower speed side. The engine control device comprises an engine mode determining section, a gear detection section, a kick-down detection section, and a control section. The engine mode determining section is configured to determine whether the engine mode is in the power mode or in the economy mode. The gear detection section is configured to detect a current gear of a plurality of gears. The kick-down detection section configured to detect the occurrence of a kick-down instruction. The control section configured to switch the engine mode into the power mode when the kick-down instruction is detected while the engine mode is in the economy mode and the gears are in the lowest gear as a result of the forcible downshifting.

The working vehicle control device can be applied to construction machinery such as a wheel loader that is capable of switching engine modes between the power mode and the economy mode, and is capable of forcibly downshifting gears of a transmission to a low gear side. At the time of engine driving, it is determined whether the mode is in the power mode or in the economy mode. When there is the kick-down instruction in the economy mode and the gears have at least gone into the lowest gear as a result of the forcible downshifting, the power mode is gone into.

When high power is required temporarily while working using the lowest gear in the economy mode, it is possible to go into the power mode using the kick-down instruction operation such as resulting from pressing a kick-down switch. An operation member such as a switch for instructing the kick-down is provided at a member such as a working equipment operation lever that is normally operated by the operator. The operator is therefore able to go smoothly from the economy mode into the power mode while working. It is therefore possible to temporarily raise engine output in a straightforward manner without interrupting working and work performance is therefore improved.

With the engine control device for a working vehicle of a second aspect of the invention, in the control device of the first aspect of the invention, the working vehicle includes a working equipment operation lever for operating working equipment. An instruction member for instructing execution of the kick-down is also provided at a grip section of the working equipment operation lever. The kick-down detection section is operatively coupled to an instruction member for executing the kick-down provided at a grip section of the working equipment operation lever in the working vehicle control device is applied to.

It is therefore possible to instruct execution of the kick-down while operating the working equipment operation lever while working so as to go into the power mode. The work performance is therefore further improved.

With the engine control device for a working vehicle of a third aspect of the invention, in the control device of the first and second aspects of the invention, the working vehicle includes a forward/reverse switching lever that switches a traveling direction of the working vehicle between forward and reverse, and a gear shift lever for changing the gears of the transmission. An operation detection section configured to detect an operation of one of the forward/reverse switching lever or the gear shift lever is also provided. The control section is further configured to execute a kick-down release control to switch back from the power mode to the economy mode when the forward/reverse switching lever or the gear shift lever is operated after switching from the economy mode to the power mode as a result of the kick-down instruction.

The forward/reverse switching lever and the gear shift lever for shifting gears is also provided in the working vehicle to which the control device is applied to. As described above, when there is the kick-down instruction in the economy mode when in the lowest gear, the power mode is gone into from the economy mode but is released in this state as a result of operating the forward/reverse switching lever or the gear shift lever so as to return to the economy mode from the power mode.

As a result, it is possible to easily go into the power mode when engine power is desired temporarily during the economy mode, and this state can be released and the economy mode returned to using a straightforward operation. It is therefore possible to further improve work performance.

With engine control device of a working vehicle of a fourth aspect of the invention, in the control device of any one of the first to third aspects of the invention, the working vehicle has a manual transmission mode during which the gears can be shifted manually and an automatic transmission mode during which the gear shift can be executed automatically as transmission modes. A transmission mode determining section configured to determine whether the transmission mode is the manual transmission mode or the automatic transmission mode is also provided. During automatic transmission mode, the control section is configured to restrict the automatic downshifting from the second gear on the low speed side to the first gear, to forcibly shift the gears to the first gear when the kick-down instruction is detected when the gears are in the second gear. Then, the control section is further configured to switch to the power mode when another kick-down instruction is detected in this state when the engine is in the economy mode. On the other hand, during the manual transmission mode, the control section is configured to forcibly shift the gears into the first gear when there is the kick-down instruction when traveling in the second gear, and to switch to the power mode when another kick-down instruction is detected in this state when the engine is in the economy mode.

In the case of automatic transmission mode, the control device shifts down as far as the second gear using the automatic transmission. When there is the kick-down instruction when in the second gear, the first gear is shifted down to. When there is the kick-down instruction again in this state when in the economy mode, the power mode is gone into. Further, when there is the kick-down instruction when driving in the second gear during the manual transmission mode, the first gear is shifted down to. When there is the kick-down instruction again in this state when in the economy mode, the power mode is gone into.

It is therefore possible to go smoothly from the economy mode into the power mode and work performance is improved.

With the engine control device for a working vehicle of a fifth aspect of the invention, at the control device of the third aspect of the invention, a braking detection section configured to detect that brake operation has taken place is provided. The control section is further configured to execute a brake cutoff control to shift the gears to a neutral position at the time of braking and to shift the gears to the second gear when the braking is released. The control section is further configured to restrict the brake cutoff control to maintain the gears in the first gear until the kick-down release control is executed when the gears are changed to the first gear as the result of the kick-down instruction.

The control device executes a brake cutoff control, i.e. when the operator operates the brake, a neutral position (neutral state) is shifted to regardless of the position of the gears. When the brakes are released, the gears are shifted into the second gear, and the transmission is controlled to start off in the second gear.

When the brake cutoff control is executed as described above due to the braking in the event that first gear is shifted down to as the result of the kick-down or the first gear of the power mode is shifted to as the result of the kick-down, the transmission shifts into the second gear. In doing so, the difference with previous gear (first gear) during working is that an operation is required by the operator in order to shift down to the first gear again. This lowers work efficiency.

In this invention, the transmission is therefore kept in the first gear until the kick-down release control is executed, i.e. until the forward/reverse switching lever of the gears or the shift lever is operated when the first gear is shifted to as a result of the kick-down.

The brake cutoff control is therefore restricted and the first gear is remained in without going into the second gear even if the braking takes place while working in the first gear. Falls in working efficiency can therefore be avoided.

BRIEF DESCRIPTION OF THE DRAWINGS

FIG. 7 is a characteristic diagram illustrating the economy mode and the power mode.

FIG. 8 is a diagram showing the relationship of the operation of the gear shift lever, transmission mode, and the kick-down switch.

DETAIL DESCRIPTION OF PREFERRED EMBODIMENTS

The following is a description of an example of the case of adopting an engine control device of a first embodiment of the present invention in a wheel loader.

Regarding directions such as front, rear, left and right, that come up in the description below, a description is given of a direction from front to rear, and a direction orthogonal to the direction from front to rear that is taken as left to right, from the perspective of an operator sitting in the operator seat.

Overall Configuration

Figure 1:
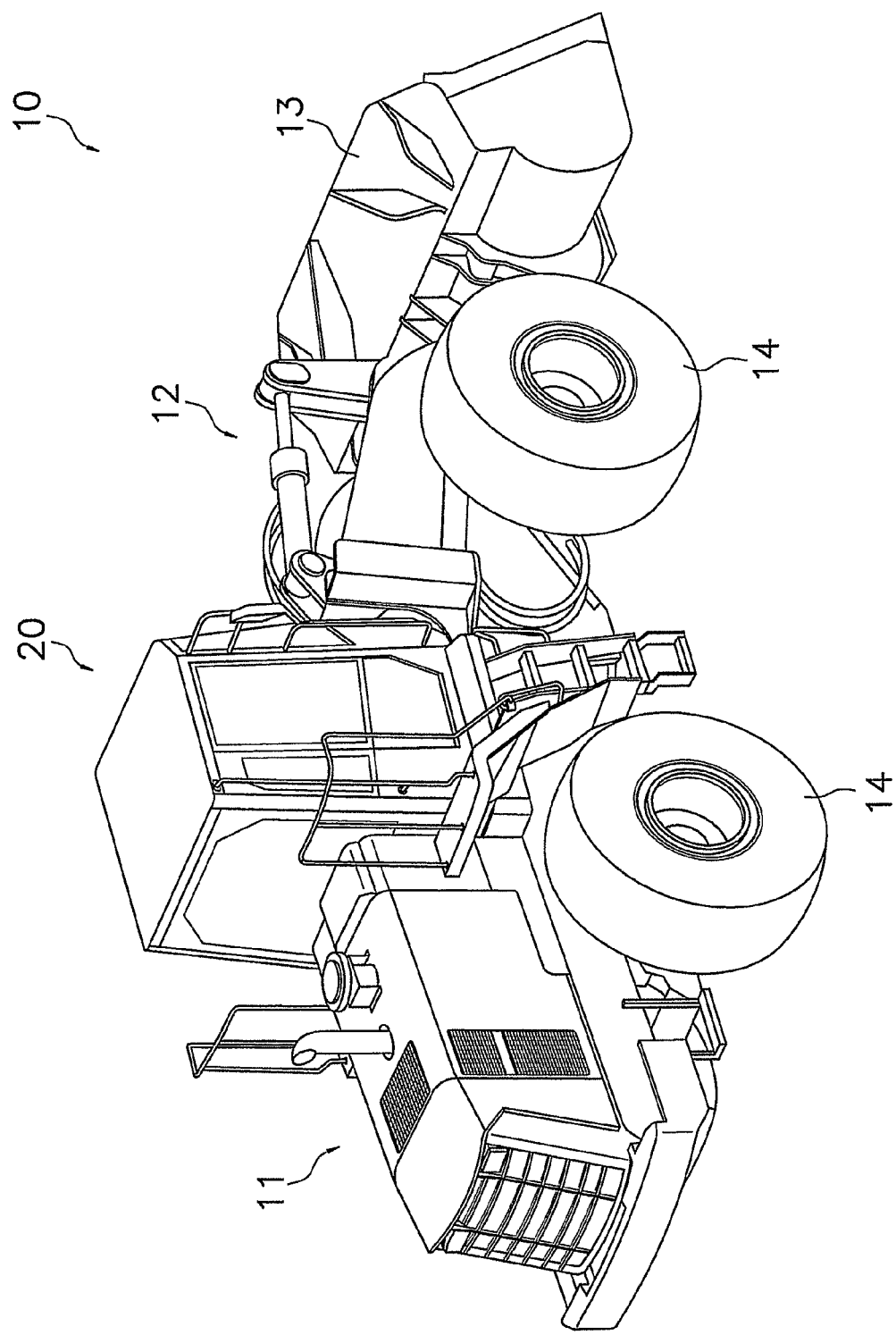
FIG. 1 is a diagram of the outer appearance of a wheel loader.

As shown in FIG. 1, a wheel loader 10 has a vehicle body 11, a lift arm 12 fitted to the front of the vehicle body 11, a bucket 13 fitted to the end of the lift arm 12, four tires 14 that rotate while supported at the vehicle body 11 so as to enable the vehicle to travel, and a cab 20 mounted at an upper part of the vehicle body 11.

The vehicle body 11 has an engine room that houses an engine (not shown) and a drive unit that drives the lift arm 12 and the bucket 13.

The lift arm 12 is an arm member for raising the bucket 13 fitted to the end and is driven by a lift cylinder also provided.

The bucket 13 is fitted to an end of the lift arm 12 and can be dumped and tilted by the bucket cylinder.

The cab 20 is an operator cab for use by the operator made from a combination of a number of steel tubes and steel plates and is located slightly to the front of a central part of the vehicle body 11.

Internal Cab Layout

Figure 2:
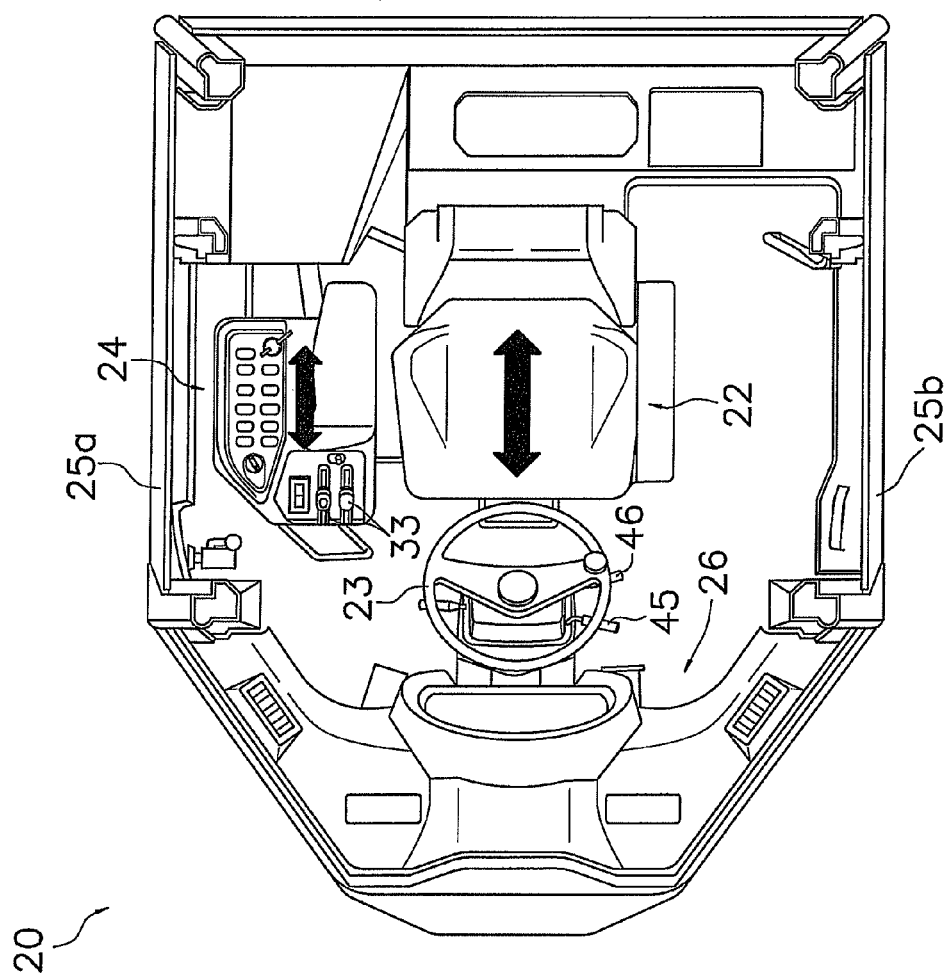
FIG. 2 is a plan view of the location of a cabin of the wheel loader.
Figure 3:
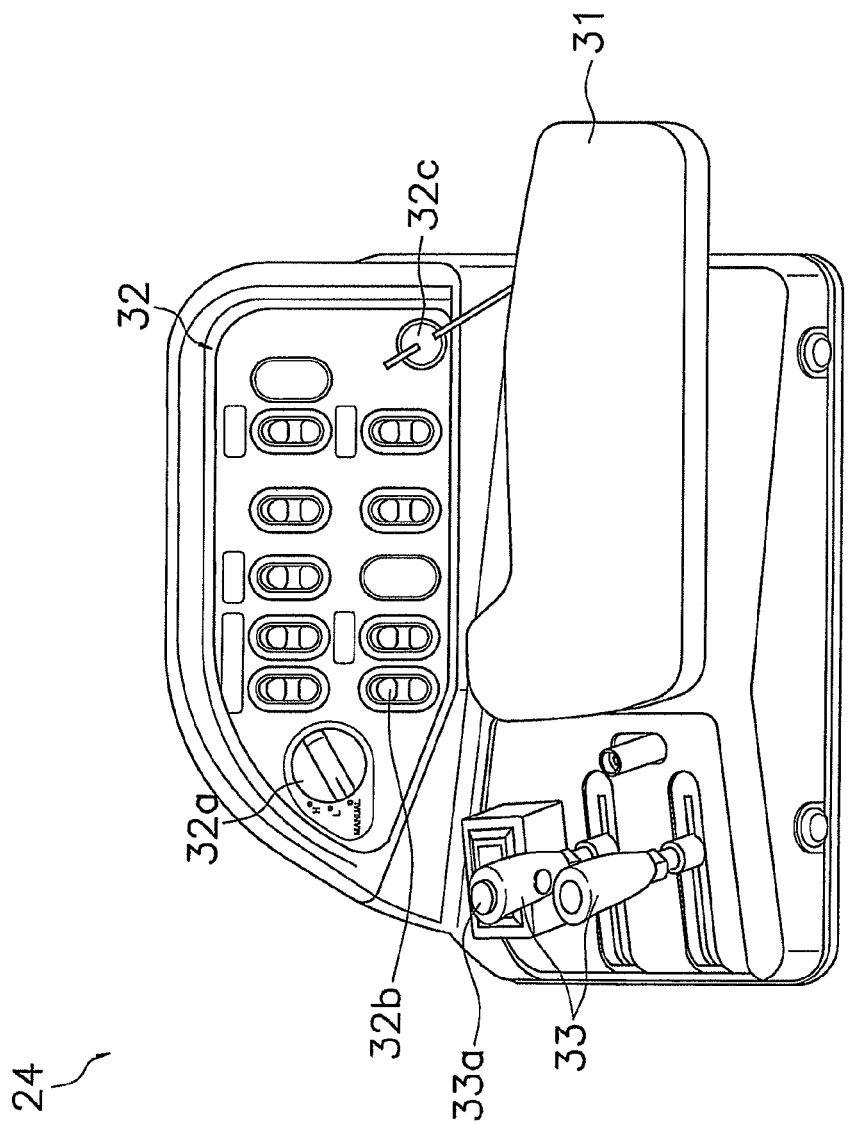
FIG. 3 is a diagram showing the arrangement of a right console box within the cabin.

As shown in FIG. 2 and FIG. 3 that is an enlarged exploded perspective view of FIG. 2, the cab 20 contains an operator seat (operators chair) 22, a steering wheel 23, a right console box 24, a front console box 26, and working equipment levers 33 located to the front of the right console box 24 positioned in the vicinity of the operator seat 22. Further, a forward/reverse switching lever 45 is provided at a front side of a left side portion below the steering wheel 23 to the front of the operator seat 22, with a gear shift lever 46 provided to the rear. Boarding doors 25a, 25b are fitted to the left and right sides with the operator sat in the operator seat 22.

The operator seat 22 is a seat for the operator steering the wheel loader 10 to sit in and is located substantially in the vicinity of the center of the cab 20. The operator seat 22 can be moved backwards and forwards along a slide rail (not shown).

The steering wheel 23 is fitted so as to project from the front console box 26 located to the front of the operator seat 22 and the direction of travel of the wheel loader 10 can be changed by turning the steering wheel 23 to the left and right.

The right console box 24 is a box positioned at the upper surface of a switch panel 32. and is located in a space between the operator seat 22 and the right side boarding door 25a. The right console box 24 can be moved backwards and forwards along a slide rail (not shown). An armrest 31 is arranged at an upper surface of the right console box 24.

The armrest 31 is a flat sheet for use when operating the working equipment levers 33 positioned at the right arm of the operator during operation and is arranged to the rear of the right console box 24.

A transmission mode switching switch 32a for switching transmission modes between a manual transmission mode and an automatic transmission mode, an engine mode switching switch 32b for switching between the power mode and the economy mode, working equipment switches used when stationary including a key switch 32c for starting the engine and a boom and bucket remote position switch, and maintenance switches including a fan reverse switch are located at the switch panel 32.

The working equipment levers 33 are levers for operating the working equipment fitted to the front of the wheel loader 10, i.e. the lift arm 12 and the bucket 13, as a result of the two levers being tilted forward and backward. Grips grasped by the operator are provided at upper parts of the working equipment levers 33. A kick-down switch 33a for executing the kick-down (forcible downshifting) is provided at an upper surface of one of the grips of the working equipment levers 33 (the outer side in this example). Speed change control using the operation of the kick-down switch 33a is described in the following but to summarize, when the switch is pressed down while in the second gear during manual transmission mode, the first gear is shifted down to. When the switch is pressed with the vehicle velocity at low speed or while in the second gear during the automatic transmission mode, the first gear is shifted down to. When vehicle velocity is greater than or equal to a certain velocity, shifting down takes place sequentially every time the switch is pressed so as to go from, for example, fourth, to third, to second gear, as far down as to second gear. When the kick-down switch 33 is pressed down again when shifted down from the second gear to the first gear by the kick-down switch 33a, the power mode is gone to when the engine is in the economy mode. The operator can therefore carry out a kick-down operation by pressing down the kick-down switch 33a while gripping the working equipment levers 33 during operation of the working equipment. It is therefore possible to increase the power of the working equipment.

The forward/reverse switching lever 45 is a lever that controls switching of the forward hydraulic clutch and the reverse hydraulic clutch and switching over between traveling forward and in reverse. Further, the gear shift lever 46 is a lever for shifting gears of the transmission. For example, the first gear, the second gear, the third gear, and the fourth gear are positioned to the front of the operator (driver) sitting in the operator seat 22.

Configuration for Control

Figure 4:
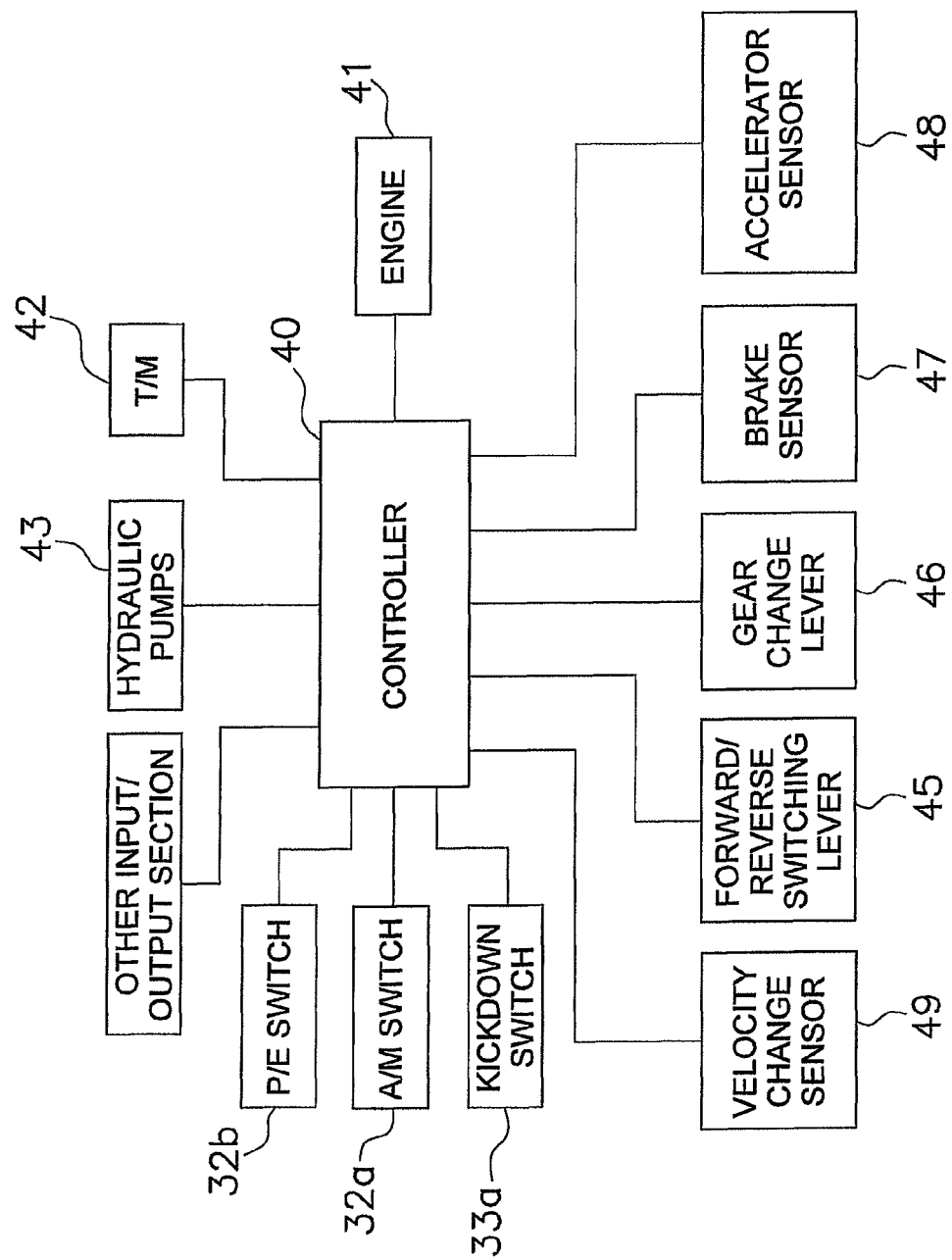
FIG. 4 is a block diagram of control.

A block diagram schematically depicting control of the wheel loader 10 is shown in FIG. 4. The wheel loader 10 has a controller 40. The controller 40 is constructed from a microcomputer having a CPU, RAM and ROM, etc. The engine 41, transmission 42, and various hydraulic pumps 43 including working equipment hydraulic pumps are connected to the controller 40. Specifically, a governor for supplying fuel to the engine 41 and an electromagnetic switching valve for controlling the forward/reverse hydraulic clutches and the speed change hydraulic clutch provided at the transmission 42 are connected to the controller 40 but are not described in detail. The forward/reverse switching lever 45, the gear shift lever 46, a brake sensor 47, an accelerator sensor 48, a velocity change sensor 49, the engine mode switching switch 32b, the transmission mode switching switch 32a and the switch 33a are connected to the controller 40.

The forward/reverse switching lever 45 outputs a signal for controlling the forward/reverse switching hydraulic clutches to the controller 40. The controller 40 controls an electromagnetic switching valve for hydraulic control of the transmission 42 in accordance with the signal from the forward/reverse switching lever 45. As with the gear shift lever 46, the controller 40 controls an electromagnetic switching valve for hydraulic clutch control of the transmission 42 according to a signal from the gear shift lever 46. The controller 40 is capable of recognizing which position each of the levers 45, 46 are being operated in, i.e. forward or reverse, and which number gear the gears are set to, using the signals from the levers 45, 46. The controller 40 is of course also capable of recognizing which gear the gears are in automatic transmission mode.

The brake sensor 47 is a sensor that detects braking and releasing of braking resulting from depression of the brake pedal by the operator. The accelerator sensor 48 is a sensor that detects the extent of opening of the accelerator by detecting the stroke of the accelerator pedal. The velocity change sensor 49 is a sensor that detects the velocity of the vehicle. Signals from the sensors 47, 48 and 49 are inputted to the controller 40.

Further, signals from each of the switches 32b, 32a and 33a are inputted to the controller 40. The controller 40 then switches over engine mode and transmission mode based on the signals from each of the switches and execute the kick-down.

Control Processing

Figure 5:
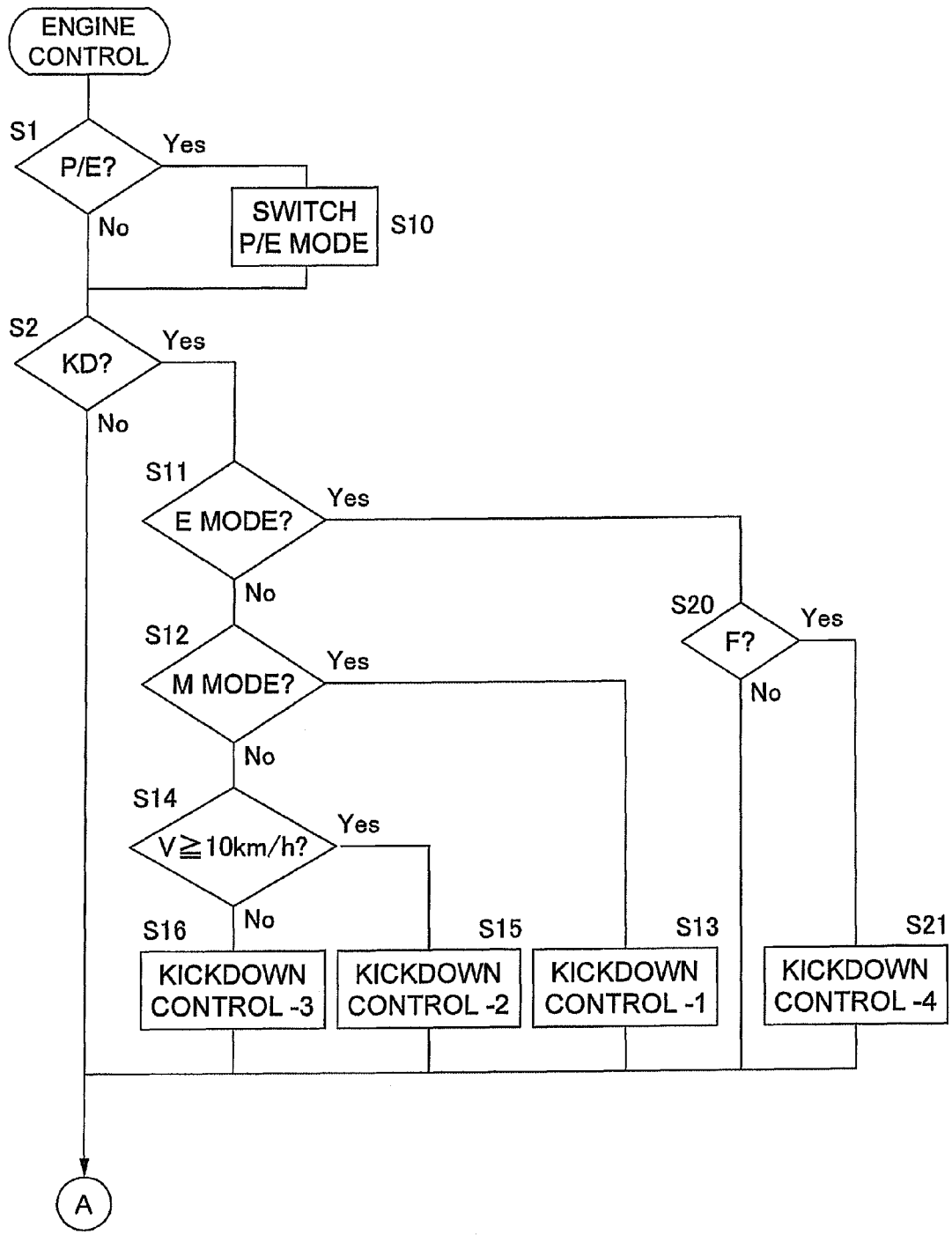
FIG. 5 is a flowchart of control processing for an embodiment of the present invention.
Figure 6:
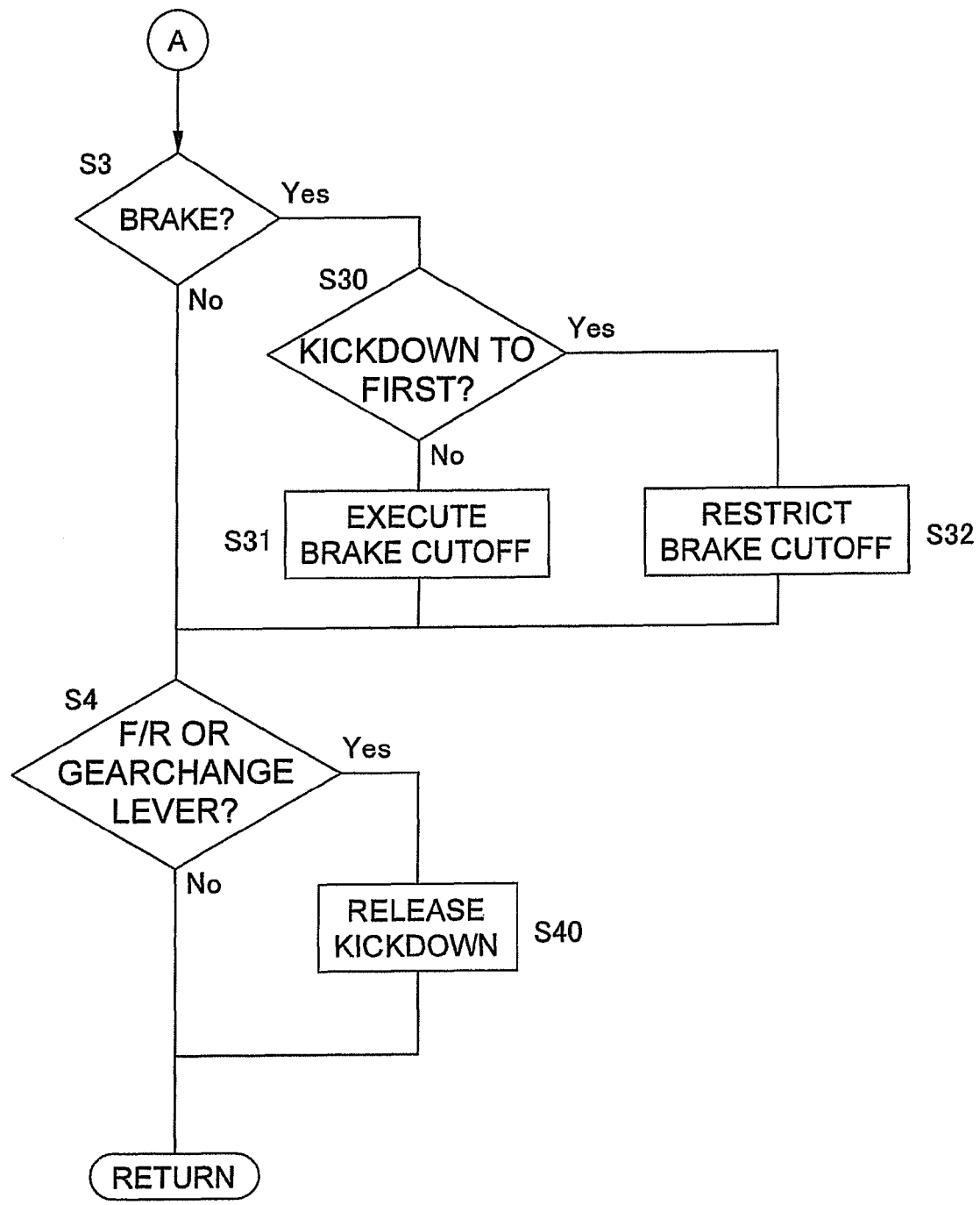
FIG. 6 is a further flowchart of control processing for an embodiment of the present invention.

Next, control processing is described according to the flowcharts shown in FIG. 5 and FIG. 6. Here, a description is given mainly taking note of engine control when the kick-down switch is operated during traveling or during working. The engine mode is set to the economy mode at the time of starting up, with work being carried out in the economy mode as long as the engine mode switching switch is not operated.

Under the above conditions, it is determined in step S1 whether or not engine mode switching switch 32b is operated. In step S2, it is determined whether or not the kick-down switch 33a is operated. In step S3, it is determined whether or not a braking operation is taking place. In step S4 it is determined whether the forward/reverse switching lever 45 or gear shift lever 46 is operated.

Economy Mode and Power Mode

When the engine mode switching switch 32b is operated, processing proceeds from step S1 to step S10 and the engine mode is switched over. Namely, the power mode is switched over to in the case of the economy mode, and the economy mode is switched over to in the case of the power mode.

A straightforward description of the power mode and the economy mode is now given. The power mode is a mode placing importance on work performance and the economy mode is a mode placing importance on fuel consumption.

When the power mode is selected, an engine output torque characteristic as shown by engine output torque line ELa in FIG. 7 is set. Further, an absorption torque characteristic shown by an absorption torque line PLa is set. The absorption torque is the sum of the torque converter absorption torque and the working equipment hydraulic pump absorption torque and is decided using the traveling environment, working load, and discharge oil quantity adjustment for the working equipment hydraulic pump. In FIG. 7, the absorption torque line PLa is a monotonically increasing function taking engine speed as a variable. In this case, it is possible to carry out heavy excavation work in a highly efficient manner by matching output torque of the engine 41 at the matching point Ma and the absorption torque and by having the hydraulic pump absorb engine output occurring at the matching point Ma, i.e. the maximum horsepower of the engine 41.

When the economy mode is selected, an engine output torque characteristic shown by an engine output torque line for signal ELb is set. In this case, the output torque of the engine 41 at the matching point Mb and the absorption torque match. In the economy mode, it is possible to make output torque and absorption torque of the engine 41 at a matching point Mb of lower fuel consumption than the matching point Ma for the power mode match. It is therefore possible to use the engine 41 in a region with good fuel efficiency, and fuel consumption can therefore be improved.

Switch

When the kick-down switch 33a is operated, processing proceeds from step S2 to step S11. In step S11, it is determined whether the engine is in the economy mode or in the power mode.

(1) Kick-Down/Power Mode

When the engine is in the power mode when the kick-down switch 33a is operated, step S12 is proceeded to from step S11. It is then determined in step S12 whether or not the transmission mode is the manual transmission mode.

In the case of manual transmission mode, step S13 is proceeded to from step S12, and "kick-down control-1" (described in the following with reference to FIG. 8) is executed.

When the engine is in the power mode and the transmission mode is in automatic transmission mode, step S14 is proceeded to from step S12. In step S14, it is determined whether or not velocity is 10 km/h or higher.

When velocity is 10 km/h or higher, i.e. not low speed, step S15 is proceeded to from step S14 and "kick-down control-2" (described in the following with reference to FIG. 8) is executed.

When velocity is less than 10 km/h, i.e. low speed, step S16 is proceeded to from step S14 and "kick-down control-3" (described in the following with reference to FIG. 8) is executed.

The shifting down of gears one gear at a time but not shifting forcibly into the first gear when the velocity of the vehicle is 10 km/h or higher in the automatic transmission mode is preferable because shifting down as far as the first gear when the vehicle velocity is relatively high can cause the engine brake to cut in abruptly and this is not desirable.

(2) Kick-Down/Economy Mode

When the engine is in the economy mode at the time of operation of the kick-down switch 33a, step S20 is proceeded to from step S11. In step S20, it is determined whether or not the forward/reverse lever is on the forward side. When the forward/reverse lever is on the forward side, step S21 is proceeded to from step S20, and in step S21 "kick-down control-4" (refer to FIG. 8 in the following) is executed.

Kick-Down Control: Operation by Kick-Down Switch Operation

Next, a description is given using FIG. 8 of the operation (kick-down control-1, -2, -3, -4) for cases where the kick-down switch 33a is operated in each state. A description is given here of an example of the case of four speeds for traveling forwards and in the reverse.

(1) Kick-Down Control-1

A description is given for the case of the kick-down control-1 of step S13, i.e. when the manual transmission mode is set in the power mode. When the gear shift lever is in the first, third, or fourth gear, the gear of the transmission is fixed. A change in gears such as shifting down therefore does not take place even if the kick-down switch 33a is pressed, i.e. the kick-down switch 33a is not in effect. When the gear shift lever is in the second gear, the gear of the transmission is fixed in the second gear. In this case, when the kick-down switch 33a is pressed, the gears shift down from the second gear to the first gear. Even if the kick-down switch 33a is pressed again in this state, the engine mode will not be switched over because the engine is already in the power mode.

(2) Kick-Down Control-2

A description is now given for the case of the kick-down control-2 of step S15, i.e. when the automatic transmission mode is set in the power mode and the speed is high. When the gear shift lever is in third and fourth gear, gear changing takes place automatically between the second to fourth gears at the transmission. When the kick-down switch 33a is pressed down in this case, shifting down is carried out one gear at a time, i.e. the kick-down switch 33a is in effect. Even if the kick-down switch 33a is pressed again when in the first gear, the engine mode will not be switched over because the engine is already in the power mode.

When the gear shift lever is in the second gear, the gear of the transmission is fixed in the second gear. In this case, when the kick-down switch 33a is pressed, the gears shift down from the second gear to the first gear. Even if the kick-down switch 33a is pressed again in this state, the engine mode will not be switched over because the engine is already in the power mode.

Further, when the gear shift lever is in the first gear, the gears of the transmission are fixed in the first gear. Even if the kick-down switch 33a is pressed, the operation is not in effect and processing does not take place.

(3) Kick-Down Control-3

A description is now given for the case of the kick-down control-3 of step S16, i.e. when automatic transmission mode is set in the power mode and the speed is low. When the gear shift lever is in third and fourth gear, gear changing takes place automatically between the second to fourth gears at the transmission. In this case, when the kick-down switch 33a is pressed, the gears are forcibly shifted down to the first gear, i.e. the kick-down switch 33a is in effect. Even if the kick-down switch 33a is pressed again when in the first gear, the engine mode will not be switched over because the engine is already in the power mode.

The case for when the gear shift lever is in the second gear and the first gear is the same as for the kick-down control-2 described previously, i.e. when the gear shift lever is in the second and first gear, the gears of the transmission are fixed in the second or first gear. The first gear is then shifted down to when the kick-down switch 33a is pressed when in the second gear. When the gear shift lever is in the first gear, even if the kick-down switch 33a is pressed down, this operation is ineffective.

(4) Kick-Down Control-4

A description is now given for the case of the kick-down control-4 of step S21, i.e. when the economy mode is set.

With kick-down control in this case, processing after shifting down to the first gear as a result of operation of the kick-down switch 33a is different than the kick-down control-1 to -3 described above but processing thereafter is the same.

In the kick-down control-4, when the kick-down switch 33a is pressed down again in a situation where the first gear has been shifted down to using the kick-down switch 33a when operation of the kick-down switch 33a is in effect, the engine switches over from the economy mode to the power mode.

As shown above, when power is necessary in the economy mode in a state of having shifted down to the first gear as a result of kicking down, the operator can switch the engine to the power mode by operating the kick-down switch 33a at a head part of one of the working equipment levers 33. It is therefore straightforward to increase engine output without interrupting working and working with heavy loads can be achieved.

Brake Operation

First, a straightforward explanation is given of a brake cutoff control. The brake cutoff control is a control that exerts control so that a restrictive force acts when the brake pedal is operated, with the gears of the transmission automatically being put into neutral, and with movement thereafter taking place in the second gear.

Cases of shifting the gears into the first gear by kicking down and driving/working are common and typical in the case of heavy working loads. In this situation, when the second gear is shifted to every time the brake pedal is operated as a result of the brake cutoff control, it is necessary for the operator to perform the frustrating operation of shifting down into the first gear again using the kick-down switch.

Because of this, in this embodiment, when the brakes are operated, it is determined whether the transmission has kicked down the gears into the first gear. Whether the brake cutoff control is executed or is restricted is then controlled based on these results. Control processing in this case is described in the following.

When the brakes are operated, step S30 is proceeded to from step S3 in FIG. 6. In step S30, it is determined whether or not the gears are currently shifted down into the first gear as a result of kicking down. When the gears have not been shifted into the first gear as a result of kicking down, step S31 is proceeded to from step S30, and a brake cutoff control is executed in step S31.

On the other hand, when braking takes place during driving of working with the gears shifted down into the first gear as a result of kicking down, step S32 is proceeded to from step S30. The brake cutoff control is then restricted in step S32. Specifically, during braking, restrictive forces act and the gears are automatically shifted into a neutral position. Starting off then takes place in the first gear rather than in the second gear.

In the above, the brake cutoff control is restricted when driving or working with the gears shifted to the first gear as a result of kicking down and the gears are controlled to be kept in the first gear even if the brake pedal is operated. Falls in working efficiency when working with heavy loads can therefore be avoided.

Releasing Kick-Down

Next, step S40 is proceeded to from step S4 when the forward/reverse switching lever 45 or the gear change lever 46 is operated. This releases the "kick-down state".

Here, "kick-down state" is a state where the first gear is shifted down to as a result of operation of the kick-down switch 33a in step S21. This is also "kick-down state" in the case of executing step S32 above.

After executing step S40, the economy mode is returned to from the power mode in the case of the state where step S21 is executed. The usual brake cutoff control is then put into effect when step S32 is executed and the brake cutoff control is restricted.

Effects of the Embodiments

According to the above embodiments, it is possible to go into the power mode simply by operating the kick-down switch 33a provided at a working equipment lever while working with the gears shifted down into the first gear as a result of kicking down in the economy mode. The operator can therefore easily obtain high output from the engine without causing interruptions while working and work performance is therefore improved.

Further, when a braking operation takes place during driving or working when the first gear has been shifted to as a result of the kick-down, the brake cutoff control is restricted. This means that the gears remain fixed in the first gear even if the brake pedal is operated. Falls in working efficiency when working with heavy loads can therefore be avoided.

It is also possible to release the kick-down by operating the forward/reverse switching lever or the gear shift lever. It is therefore possible to easily go into the power mode when power is just required temporarily while in the economy mode. It is then possible to return to the economy mode by releasing this state with a simple operation. Further, it is possible to easily release restriction of a brake cutoff control and further improve work performance.

Other Embodiments (a) In the above embodiment, a description is given of the case of having the economy mode and the power mode as engine modes but the types of engine mode are by no means limited in this respect. For example, the present invention is also similarly applicable if the economy mode is divided into a number of modes.

(b) In the above embodiment, the power mode is gone to when the kick-down switch is operated during traveling or working with the first gear having been kicked down to in the economy mode. However, it is also possible for the power mode to be gone to as the result of operation of the kick-down switch in the case of other states in the economy mode. For example, in the above embodiment, operation of the kick-down switch is not in effect when fixed in the first gear of a manual transmission mode or when fixed in the first gear of an automatic transmission mode. However, operation of the kick-down switch can also be effective in this case so that the engine mode can be switched from the economy mode to the power mode as a result of operating the kick-down switch.

(c) The positioning of the kick-down switch is not limited to the above embodiment. However, it is preferable for the kick-down switch to be positioned at a member that the operator can operate while working.

(d) The conditions for releasing the kick-down are by no means limited to those of the above embodiment. It is also possible for kicking down to be released as a result of operations other than operation of the forward/reverse lever or the gear shift lever.

(e) In the above embodiment, the present invention is applied to wheel loaders but is also similarly applicable to other construction equipment.

The present invention is capable of enabling engine output to be increased smoothly when working in the economy mode without impairing work performance. The present invention is therefore useful as an engine control device.

The invention claimed is:

1. An engine control device for a working vehicle capable of switching between engine modes of a power mode where an engine operates at high-horsepower giving priority to work performance and an economy mode where the engine operates at low-horsepower giving priority to low fuel consumption, and capable of forcibly downshifting through gears of a transmission so as to shift down to a lower speed side, the engine control device comprising:
   an engine mode determining section configured to determine whether the engine mode is in the power mode or in the economy mode;
   a gear detection section configured to detect a current gear of a plurality of gears;
   a kick-down detection section configured to detect an occurrence of a kick-down instruction; and
   a control section configured to switch the engine mode into the power mode when the kick-down instruction is detected while the engine mode is in the economy mode and the gears are in the lowest gear as a result of the forcible downshifting.

2. The engine control device for a working vehicle according to claim 1, wherein
   the kick-down detection section is operatively coupled to an instruction member for instructing execution of the forcible downshifting provided at a grip section of a working equipment operation lever used to operate working equipment of the working vehicle.

3. The engine control device for a working vehicle according to claim 1, further comprising
   an operation detection section configured to detect an operation of one of a forward/reverse switching lever for switching a traveling direction of the working vehicle between forward and reverse and a gear shift lever for shifting the gears of the transmission,
   the control section is further configured to execute a kick-down release control to switch back from the power mode to the economy mode when the one of the forward/reverse switching lever and the gear shift lever is operated after switching from the economy mode to the power mode as a result of the kick-down instruction.

4. The engine control device for a working vehicle according to claim 1, further comprising
   a transmission mode determining section configured to determine whether a transmission mode of the working vehicle is in a manual transmission mode during which the gears are shifted manually or an automatic transmission mode during which the gearshift is executed automatically,
   the control section being further configured to restrict automatic downshifting of the gears from the second gear on the low speed side to the first gear during the automatic transmission mode, to forcibly downshift the gears to the first gear when the kick-down instruction is detected when the gears are in the second gear, and then to switch to the power mode when another kick-down instruction is detected when the gears are in the first gear when the engine is in the economy mode, and
   the control section being further configured to forcibly downshift the gears into the first gear when the kick-down instruction is detected when traveling in the second gear during the manual transmission mode, and to switch to the power mode when another kick-down instruction is detected when the gears are in the first gear when the engine is in the economy mode.

5. The engine control device for a working vehicle according to claim 3, further comprising
a braking detection section configured to detect that a brake operation has taken place,
the control section being further configured to execute a brake cutoff control to shift the gears to a neutral position at the time of braking and to shift the gears to the second gear when the braking is released, and
the control section being further configured to restrict the brake cutoff control to maintain the gears in the first gear until the kick-down release control is executed when the gears are downshifted to the first gear as the result of the kick-down instruction.

* * * * *